United States Patent
Abe et al.

[11] Patent Number: 6,130,995
[45] Date of Patent: Oct. 10, 2000

[54] INTERNAL INDICATOR OF A VIEWFINDER

[75] Inventors: Tetsuya Abe, Hokkaido; Ryota Ogawa, Saitama, both of Japan

[73] Assignee: Asahi Kogaku Kogyo Kabushiki Kaisha, Tokyo, Japan

[21] Appl. No.: 09/317,615

[22] Filed: May 25, 1999

[30] Foreign Application Priority Data

May 26, 1998 [JP] Japan ................................. 10-144514

[51] Int. Cl.⁷ .................................................. G03B 17/20
[52] U.S. Cl. ............................................................ 396/296
[58] Field of Search .............................................. 396/296

[56] References Cited

U.S. PATENT DOCUMENTS

| | | | |
|---|---|---|---|
| 5,581,318 | 12/1996 | Shiratori | 396/296 |
| 5,802,408 | 9/1998 | Suda | 396/296 |
| 5,893,650 | 4/1999 | Ohmura | 396/296 X |
| 6,002,887 | 12/1999 | Chiba et al. | 396/296 X |

*Primary Examiner*—W. B. Perkey
*Attorney, Agent, or Firm*—Greenblum & Bernstein, P.L.C.

[57] ABSTRACT

Disclosed is an internal indicator for a viewfinder, wherein the viewfinder includes a viewfinder optical system including an objective optical system, an erecting optical system and an eyepiece optical system, wherein an image formed by the objective optical system is viewed through the eyepiece optical system via the erecting optical system. The internal indicator includes: an information indicating device, positioned in the vicinity of the image formed by the objective optical system, for indicating photographic information that is viewed through the eyepiece optical system; and an optical element positioned in a light path, the light path extending from the information indicating device to an exit pupil of the viewfinder optical system. The optical element is formed so that a refracting power of the optical element in a radial direction towards an optical axis of the eyepiece optical system is different from a refracting power of the optical element in a direction perpendicular to the radial direction.

12 Claims, 3 Drawing Sheets

INTERNAL INDICATOR OF A VIEWFINDER

BACKGROUND OF THE INVENTION

1. Field of the Invention

The present invention relates to an indicator, provided within an optical viewfinder of a camera or the like, for visually indicating information in the field of the viewfinder, and particularly relates to an indicator, provided within a viewfinder of an SLR camera or a real-image viewfinder or LCD view finder, for visually indicating information in the field of the viewfinder.

2. Description of the Related Art

In a conventional viewfinder such as a viewfinder of a single-lens reflex camera (SLR camera) or a real-image viewfinder, an internal indicator is provided within the viewfinder to be positioned in the vicinity of an image formed through the objective optical system. The indicator visually indicates various photographic information such as shutter speed information and aperture value information so that they can be seen together with a finder view (object images) via the eyepiece of the viewfinder.

The visual information (indicated by the internal indicator) is generally viewed outside a rectangular finder view through the eyepiece, i.e., in a peripheral portion around the rectangular finder view through the eyepiece optical system, and is generally constructed on a lens surface which is rotationally symmetrical about the optical axis of the eyepiece lens. Accordingly, the information indicated by the internal indicator is seen through a peripheral portion of the eyepiece, the astigmatism thereof generally being large, so that the indicated information sometimes cannot be clearly seen due to the astigmatism.

SUMMARY OF THE INVENTION

An object of the present invention is to provide an internal indicator for a viewfinder in which the information indicated thereby can be clearly seen through the eyepiece by correcting the astigmatism thereof at a low cost of production, without modifying the design of the finder optical system.

To achieve the object mentioned above, according to an aspect of the present invention, there is provided an internal indicator for a viewfinder field, wherein the viewfinder includes a viewfinder optical system including an objective optical system, an erecting optical system and an eyepiece optical system, wherein an image (formed by the objective optical system) is viewed through the eyepiece optical system via the erecting optical system. The internal indicator includes: an information indicating device, positioned in the vicinity of the image formed by the objective optical system, for indicating photographic information that is viewed through the eyepiece optical system; and an optical element positioned in a light path, the light path extending from the information indicating device to an exit pupil of the viewfinder optical system. The optical element is formed so that a refracting power of the optical element in a radial direction towards an optical axis of the eyepiece optical system is different from a refracting power of the optical element in a direction perpendicular to both the radial direction and a direction parallel to the eyepiece optical axis AX.

Preferably, the erecting optical system includes a relay lens system through which an inverted primary image formed by the objective optical system is erected to form a secondary image which is viewed through the eyepiece optical system, and wherein the information indicating device is positioned in the vicinity of the secondary image.

Preferably, the optical element includes a surface which is not rotationally symmetrical, wherein a radius of curvature of the surface in the radial direction towards the eyepiece optical axis being different from a radius of curvature of the surface in the direction perpendicular to both the radial and parallel directions.

Alternatively, the optical element includes a cylindrical surface having a predetermined radius of curvature only in the radial direction towards the eyepiece optical axis AX.

Preferably, the optical element includes a prism having a reflecting surface for deflecting light emitted from the information indicating device towards the eyepiece optical system.

Preferably, the optical element includes a prism having a reflecting surface for deflecting light emitted from the information indicating device toward the eyepiece optical system. The exit surface of the prism is the surface which is not rotationally symmetrical through which light reflected by the reflecting surface exits from the prism.

Preferably, the viewfinder and the internal indicator are incorporated in a camera, the objective optical system being a photographic lens attached to a body of the camera. Preferably, the camera is an SLR camera.

Preferably, the information indicating device includes an LCD panel.

Preferably, the information indicating device includes an LED indicator.

According to another aspect of the present invention, there is provided an internal indicator for a viewfinder, wherein the viewfinder includes an objective optical system, an erecting optical system and an eyepiece optical system, wherein an image formed by the objective optical system is viewed through the eyepiece optical system via the erecting optical system, the internal indicator including: an information indicating device, positioned in the vicinity of the image formed by the objective optical system, for indicating photographic information that is seen through the eyepiece optical system; and a prism, positioned adjacent to the information indicating device, for reflecting the indicated photographic information towards the eyepiece optical system. The prism includes a lens surface having different refracting power in the vertical and horizontal directions thereof.

Preferably, the lens surface includes a cylindrical surface.

Note that the expression "an image formed through the objective optical system" in the present specification refers to the primary image formed through the objective optical system and any other images which are optically equivalent to the primary image, such as the secondary image formed by the relay lens or the primary imaging plane image formed by a LCD.

The present disclosure relates to subject matter contained in Japanese Patent Application No. 10-144514 (filed on May 26, 1998) which is expressly incorporated herein by reference in its entirety.

BRIEF DESCRIPTION OF THE DRAWINGS

The invention will be discussed below in detail, with reference to the accompanying drawings, in which.

DESCRIPTION OF THE PREFERRED EMBODIMENT

Figure 1:
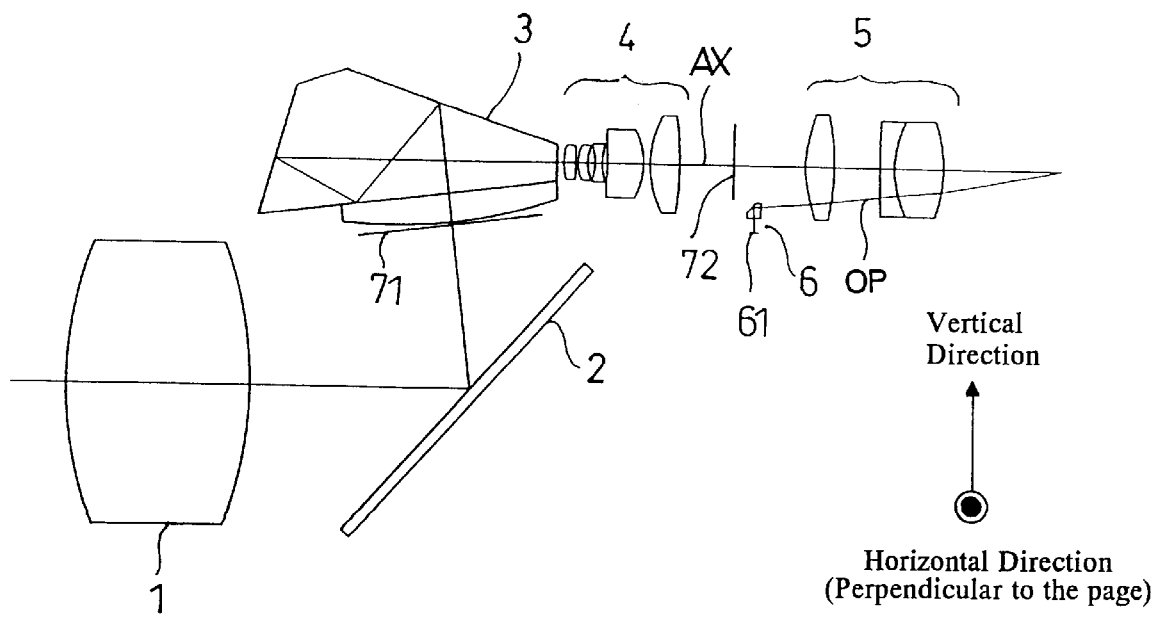
FIG. 1 is a side elevational view of an embodiment of a viewfinder optical system of an SLR camera which is provided with an internal indicator unit to which the present invention is applied.

FIG. 1 shows an embodiment of a viewfinder optical system of an SLR camera which is provided with an internal indicator unit 6. The viewfinder optical system of the SLR camera is provided with a photographic lens group 1 as an objective optical system having positive power, a reflecting mirror 2, a trapezoid prism 3, a relay lens system 4 and a eyepiece optical system 5 having positive power, in this order from the object side. A primary image 71 formed through the photographic lens group 1 is erected by the relay lens system 4, which serves as an erecting optical system, to form a secondary image 72 which is viewed through the eyepiece optical system 5. The indicator unit 6 is disposed in the vicinity of the secondary image 72, which is formed through the relay lens system 4. The indicator unit 6 indicates various photographic information such as shutter speed information, aperture value information, and other information; so that the user of the SLR camera can see the various information via the eyepiece optical system 5. The photographic lens group 1 can be a photographic lens group in an interchangeable lens barrel (not shown) which can be detachably attached to the body of the SLR camera.

Figure 2:
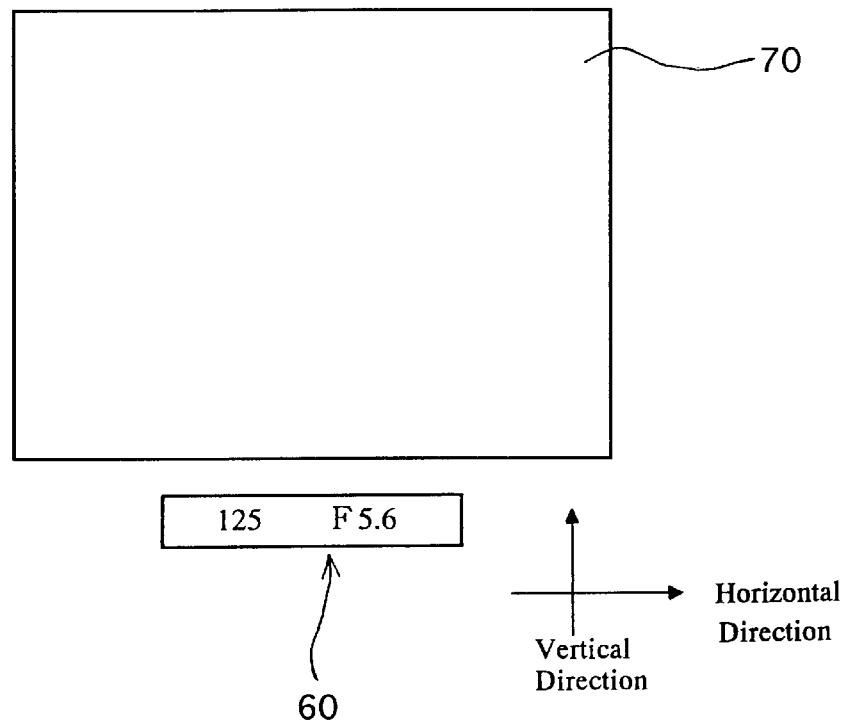
FIG. 2 is a front elevational view of a rectangular finder view and an indicator view which are seen through the eyepiece of the viewfinder optical system shown in FIG. 1.
Figure 3:
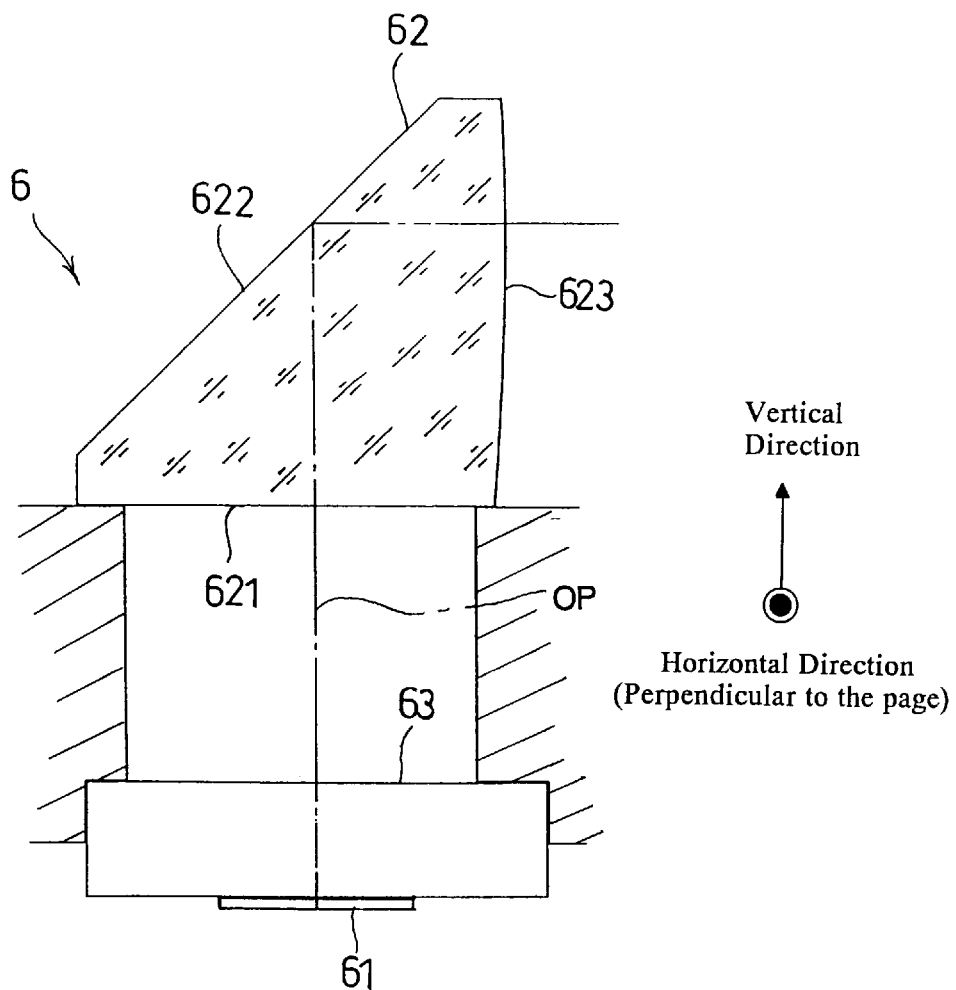
FIG. 3 is a side elevational view of the internal indicator unit provided in the SLR camera shown in FIG. 1.

As shown in FIG. 3, the indicator unit 6 is provided with an information indicating element 61, which can be an LCD panel or an LED indicator having a series of tiny LEDs. As shown in FIG. 2, the user can view (through the eyepiece optical system 5) a rectangular finder view 70, which corresponds to an image formed on the film frame, and an indicator view 60 positioned under the finder view 70. The indicator view 60 includes characters representing various photographic information indicated by the information indicating element 61 of the indicator unit 6. As can be seen in FIG. 1, the indicator unit 6 is positioned below an eyepiece optical axis AX of the eyepiece optical system 5, positioned away from the eyepiece optical axis AX by a predetermined distance. Due to this arrangement, the indicator view 60 is indicated under the finder view 70 as shown in FIG. 2, so that the finder view 70 and the indicator view 60 can be seen simultaneously through the eyepiece optical system 5.

If the information indicating element 61 is an LCD panel, the circuit board of the LCD panel is generally large because of the wiring which extends from the circuit board. Therefore, the information indicating element 61 tends to interrupt the optical path of the viewfinder if the information indicating element 61 is positioned close to the bottom of the secondary image 71. However, in the present embodiment, the information indicating element 61 does not interrupt the optical path of the viewfinder because the information indicating element 61 is positioned parallel to the eyepiece optical axis AX, while a prism 62 for reflecting the information indicated by the information indicating element 61 towards the eyepiece optical system 5 is positioned above the information indicating element 61.

In an eyepiece optical system such as the eyepiece optical system 5 shown in FIG. 1, the peripheral portion of the entire view seen through the eyepiece optical system 5 is generally unclear somewhat, due to the astigmatism and/or curvature of field of the eyepiece optical system 5. Therefore, the indicator view 60 is also unclear in the case where the indicator unit 6 is positioned in the viewfinder, so that the indicator view 60 is seen in the peripheral portion of the entire view seen through the peripheral of the eyepiece optical system 5, i.e., in the vicinity of the finder view 70. The diopter shift of the indicator view 60 that is caused by the curvature of field of the eyepiece optical system 5 can be corrected by moving the indicator unit 6 forwardly or rearwardly along the eyepiece optical axis AX. However, the difference in the diopter values in the vertical and horizontal directions of the indicator view 60 that is caused by the astigmatism of the eyepiece optical system 5 cannot be corrected by the same method. As a result, the visibility of the indicator view 60 will be different in horizontal and vertical directions thereof.

To solve this problem, an optical element having different refracting powers in horizontal and vertical directions is positioned in a light path which extends from the indicator unit 6 to the outside of the camera (e.g., to the exit pupil of the viewfinder optical system) via the prism 62 and the eyepiece optical system 5 to form the indicator view 60. The light path includes a central light ray OP (see FIGS. 1 and 3) which is emitted from the center of the information indicating element 61. The vertical and horizontal diopter difference of the indicator view 60 that is caused by the astigmatism of the eyepiece optical system 5 can be corrected by the above-mentioned optical element.

As shown in FIG. 3, the indicator unit 6 is provided with the information indicating element 61, a protection glass 63 and the prism 62. The protection glass 63 is positioned on the information indicating element 61, while the prism 62 is positioned above the protection glass 63. If the information indicating element 61 is an LCD panel, a light source (not shown) for illuminating the LCD panel is provided in the vicinity thereof.

The prism 62 is provided with an incident surface 621, a reflecting surface 622 and an exit surface 623. The light which is emitted from the information indicating element 61 passes through the protection glass 63 and subsequently enters the incident surface 621. Thereafter the light which enters the prism 6 from the incident surface 621 is incident on the reflecting surface 622 to be reflected thereby towards the exit surface 623 so that the exit light proceeds towards the eyepiece optical system 5. The exit surface 623 is formed as a curved surface having different refracting powers is horizontal and vertical directions. For example, the exit surface 623 can be formed as a surface which is not rotationally symmetrical, whose radius of curvature on a plane defined by the eyepiece optical axis AX and the light path of the internal indicator of the finder is different from that in a direction perpendicular to both the radial direction and a direction parallel to the eyepiece optical axis AX.

In the illustrated embodiment shown in FIG. 3, the exit surface 623 of the prism 62 is formed as a cylindrical surface which has a predetermined radius of curvature in a radial direction towards the eyepiece optical axis AX on a plane parallel to the page of FIG. 3 and infinite radius of curvature in a plane perpendicular the page of FIG. 3.

Table 1 below shows the numerical data of the embodiment of the viewfinder optical system from the information indicating element 61 to the eyepiece optical system 5. In Table 1, "R", "D", "Nd" and "vd" represent the radius of curvature, the thickness of the lens or distance between the lenses, the refractive index in the d-line, and the Abbe constant, respectively.

The first and second surfaces correspond to the incident and exit surfaces of the protection glass 63, respectively. The third and fourth surfaces correspond to the incident surface 621 and the exit surface (cylindrical surface) 623 of the prism 62, respectively. The fifth through ninth surfaces are those of the eyepieces optical system 5. The tenth surface corresponds to the exit pupil of the viewfinder optical system. The fourth surface is the exit surface of the prism 62, i.e., the aforementioned cylindrical surface which has a predetermined radius of curvature only in a radial direction towards the eyepiece optical axis AX. In Table 1, the radius of curvature of the fourth surface is in a radial direction towards the eyepiece optical axis AX. The radius of curvature of the fourth surface in a direction perpendicular to both the radial direction and a parallel direction towards the eyepiece optical axis AX is infinity.

TABLE 1

| Surface No. | R | D | Nd | νd |
|---|---|---|---|---|
| 1 | ∞ | 0.61 | 1.51533 | 64.1 |
| 2 | ∞ | 1.35 | | |
| 3 | ∞ | 2.50 | 1.49176 | 57.4 |
| 4** | −25.000 | 7.20 | | |
| 5* | 18.344 | 4.80 | 1.49176 | 57.4 |
| 6 | −44.100 | 7.88 | | |
| 7 | 292.600 | 2.50 | 1.80518 | 25.4 |
| 8 | 18.580 | 8.00 | 1.69680 | 55.5 |
| 9 | −24.940 | 21.00 | | |
| 10 | ∞ | | | |

| Surface No. | k | A4 | A6 | A8 |
|---|---|---|---|---|
| 5 | 0.0 | −1.0910 × 10$^{-04}$ | 1.0080 × 10$^{-07}$ | 0.0 |

The center of the information indicating element 61 is positioned apart from the eyepiece optical axis AX by 5.30 mm.

The shape of a rotationally symmetrical aspherical surface is defined by the following equation:

$$X = Ch^2 / \{1 + [1-(1+k)C^2h^2]^{1/2}\} + A4h^4 + A6h^6 + A8h^8 + \ldots$$

wherein:

X designates the distance from a tangent plane of an aspherical vertex;

C designates the curvature of the aspherical vertex (1/R);

h designates the distance from the optical axis;

k designates the conic constant;

A4 designates the fourth-order aspherical factor;

A6 designates the sixth-order aspherical factor; and

A8 designates the eighth-order aspherical factor.

Figure 4:
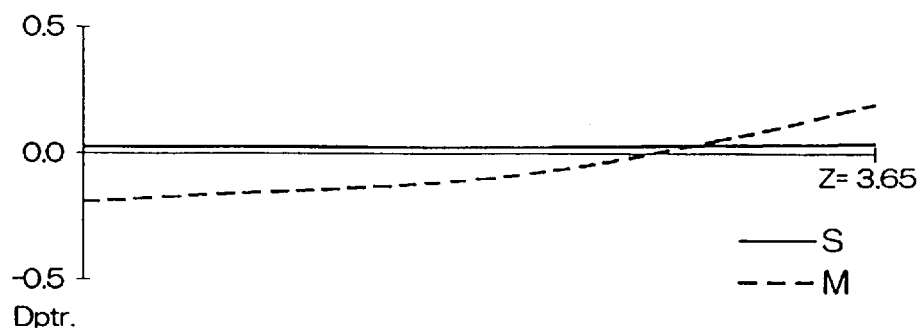
FIG. 4 is a graph which shows the astigmatism occurring through the internal indicator unit shown in FIG. 3 and the eyepiece optical system.

FIG. 4 is a graph which shows the astigmatism occurring through the internal indicator unit 6 shown in FIG. 3 and the eyepiece optical system shown in FIG. 1. In this graph, the dioptric value from the center of the apparent view which includes the indicator view 60 and is seen through the eyepiece optical system 5 to the right extremity thereof is shown. In FIG. 4, the solid line "S" designates the diopter value in the horizontal direction of the apparent view, while the broken line "M" designates the dioptric power in the vertical direction of the apparent view.

It can be understood from the FIG. 4 that the difference between the diopter value in the horizontal direction of the apparent view and the diopter value in the vertical direction of the apparent view is small, so that the image seen through the eyepiece optical system 5, i.e., both the indicator view 60 and the finder view 70 can be seen clearly.

Figure 5:
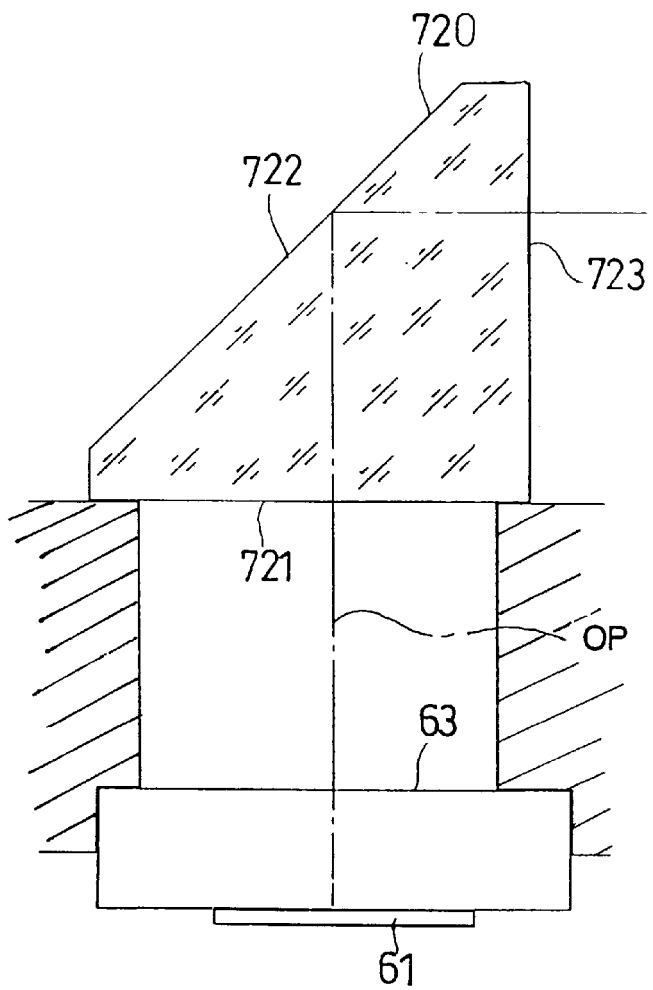
FIG. 5 is a side elevational view of a conventional internal indicator unit.

FIG. 5 shows an internal indicator unit as an example for comparison with the internal indicator unit 6 shown in FIG. 3. The internal indicator unit shown in FIG. 5 is provided with an information indicating element 61, a protection glass 63 and a prism 720. The prism 720 is provided with an incident surface 721, a reflecting surface 722 and an exit surface 723.

Figure 6:
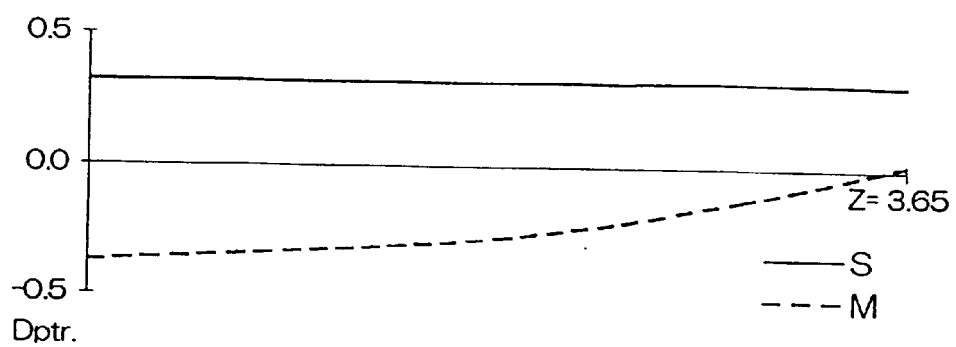
FIG. 6 is a graph which shows the astigmatism occurring through an internal indicator unit shown in FIG. 5 as a comparative example and the eyepiece optical system.

FIG. 6 is a graph which shows the astigmatism occurring through the internal indicator unit shown in FIG. 5 and the eyepiece optical system 5 shown in FIG. 1. In this graph, the diopter value from the center of the apparent view seen through the eyepiece optical system to the right extremity of apparent view is shown. In FIG. 6, the solid line "S" designates the diopter value in the horizontal direction of the apparent view, while the broken line "M" designates the diopter value in the vertical direction of the apparent view.

It can be understood from the FIG. 6 that the difference between the diopter value in the horizontal direction of the apparent view and the diopter value in the vertical direction of the apparent view is large, so that the image viewed through the eyepiece optical system cannot be seen clearly.

However, with the internal indicator unit 6 shown in FIG. 3, the astigmatism is reduced compared with the internal indicator unit 6 shown in FIG. 5, simply by modifying the shape of the exit surface 623 of the prism 62. Therefore, the indicator view 60 can be clearly seen by simply making the prism 62 out of a synthetic resin material by injection molding, which is preferable in order to provide the internal indicator of the viewfinder at a low cost of production.

As can be understood from the foregoing, according to the illustrated embodiment, the difference between the diopter value in the horizontal direction of the apparent view and the diopter value in the vertical direction of the apparent view is small, so that the finder view 70 and also the indicator view 60 can be seen clearly.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. An internal indicator for a viewfinder field, wherein said viewfinder comprises a viewfinder optical system including an objective optical system, an erecting optical system and an eyepiece optical system, wherein an image formed by said objective optical system is viewed through said eyepiece optical system via said erecting optical system, said internal indicator comprising:

an information indicating device, positioned in the vicinity of said image formed by said objective optical system, for indicating photographic information that is viewed through said eyepiece optical system; and an optical element positioned in a light path, said light path extending from said information indicating device to an exit pupil of said viewfinder optical system;

wherein said optical element is formed so that a refracting power of said optical element in a radial direction towards an optical axis of said eyepiece optical system is different from a refracting power of said optical element in a direction perpendicular to both said radial direction and a parallel direction towards the optical axis.

2. The internal indicator for a viewfinder according to claim 1, wherein said erecting optical system comprises a relay lens system through which an inverted primary image formed by said objective optical system is erected to form a secondary image which is viewed through said eyepiece optical system, and wherein said information indicating device is positioned in the vicinity of said secondary image.

3. The internal indicator for a viewfinder according to claim 1, wherein said optical element comprises a surface which is not rotationally symmetrical, wherein a radius of curvature of said surface in said radial direction towards said eyepiece optical axis being different from a radius of curvature of said surface in said direction perpendicular to both said radial and parallel directions.

4. The internal indicator for a viewfinder according to claim 1, wherein said optical element comprises a cylindrical surface having a predetermined radius of curvature only in said radial direction towards the eyepiece optical axis AX.

5. The internal indicator for a viewfinder according to claim 1, wherein said optical element comprises a prism having a reflecting surface for deflecting light emitted from said information indicating device towards said eyepiece optical system.

6. The internal indicator for a viewfinder according to claim 3, wherein said optical element comprises a prism having a reflecting surface for deflecting light emitted from said information indicating device towards said eyepiece optical system; and
wherein the exit surface of the prism comprises said surface through which light reflected by said reflecting surface exits from said prism.

7. The internal indicator for a viewfinder according to claim 1, said viewfinder and said internal indicator being incorporated in a camera, said objective optical system being a photographic lens attached to a body of said camera.

8. The internal indicator for a viewfinder according to claim 7, wherein said camera is an SLR camera.

9. The internal indicator for a viewfinder according to claim 1, wherein said information indicating device comprises an LCD panel.

10. The internal indicator for a viewfinder according to claim 1, wherein said information indicating device comprises an LED indicator.

11. An internal indicator for a viewfinder of a viewfinder, wherein said viewfinder comprises an objective optical system, an erecting optical system and an eyepiece optical system, wherein an image formed by said objective optical system is viewed through said eyepiece optical system via said erecting optical system, said internal indicator comprising:
an information indicating device, positioned in the vicinity of said image formed by said objective optical system, for indicating photographic information that is seen through said eyepiece optical system; and
a prism, positioned adjacent to said information indicating device, for reflecting said indicated photographic information towards said eyepiece optical system,
wherein said prism comprises a lens surface having different refracting power in the vertical and horizontal directions thereof.

12. The internal indicator for a viewfinder according to claim 11, wherein said lens surface comprises a cylindrical surface.

* * * * *